US012700061B2

(12) United States Patent
Edlund et al.

(10) Patent No.: US 12,700,061 B2
(45) Date of Patent: Aug. 4, 2026

(54) COMPUTER-IMPLEMENTED METHOD, COMPUTER PROGRAM PRODUCT AND SYSTEM FOR PROCESSING IMAGES

(71) Applicant: Sartorius Stedim Data Analytics AB, Umeå (SE)

(72) Inventors: Christoffer Edlund, Umeå (SE); Rickard Sjögren, Umeå (SE); Timothy Dale, Royston (GB); Gillian Lovell, Royston (GB)

(73) Assignee: Sartorius Stedim Data Analytics AB (SE)

( * ) Notice: Subject to any disclaimer, the term of this patent is extended or adjusted under 35 U.S.C. 154(b) by 544 days.

(21) Appl. No.: 18/014,998

(22) PCT Filed: Jul. 8, 2021

(86) PCT No.: PCT/EP2021/069019
§ 371 (c)(1),
(2) Date: Jan. 6, 2023

(87) PCT Pub. No.: WO2022/008667
PCT Pub. Date: Jan. 13, 2022

(65) Prior Publication Data
US 2023/0260083 A1 Aug. 17, 2023

(30) Foreign Application Priority Data
Jul. 8, 2020 (EP) ..................................... 20184636

(51) Int. Cl.
| G06T 3/4053 | (2024.01) |
| G06T 3/4046 | (2024.01) |
| G06T 5/50 | (2006.01) |

(52) U.S. Cl.
CPC .......... G06T 3/4053 (2013.01); G06T 3/4046 (2013.01); G06T 5/50 (2013.01);
(Continued)

(58) Field of Classification Search
None
See application file for complete search history.

(56) References Cited

U.S. PATENT DOCUMENTS

| 2018/0075581 A1 | 3/2018 | Shi et al. | |
| 2019/0096035 A1* | 3/2019 | Li ........................... | G06N 3/063 |

(Continued)

FOREIGN PATENT DOCUMENTS

| CN | 109255755 | 1/2019 |
| CN | 109978762 A * | 7/2019 |

(Continued)

OTHER PUBLICATIONS

D. den Brok, S. Merzbach, M. Weinmann and R. Klein, "Per-Image Super-Resolution for Material BTFs," 2020 IEEE International Conference on Computational Photography (ICCP), St. Louis, MO, USA, 2020, pp. 1-10, doi: 10.1109/ICCP48838.2020.9105256.*

(Continued)

*Primary Examiner* — Jiangeng Sun
(74) *Attorney, Agent, or Firm* — Klarquist Sparkman, LLP

(57) ABSTRACT

A computer-implemented method is provided for processing images. The method can include down-sampling a plurality of first images having a first resolution for obtaining a plurality of second images having a second resolution and training an artificial neural network model to process an input image and output an output image having a higher resolution than the input image.

15 Claims, 15 Drawing Sheets

(52) U.S. Cl.
CPC .............. *G06T 2207/10056* (2013.01); *G06T 2207/20081* (2013.01); *G06T 2207/20084* (2013.01); *G06T 2207/30004* (2013.01)

(56) References Cited

U.S. PATENT DOCUMENTS

| | | |
|---|---|---|
| 2019/0171908 A1 | 6/2019 | Salavon |
| 2020/0285959 A1 | 9/2020 | Liu et al. |
| 2021/0327028 A1* | 10/2021 | Machii .................. G06T 3/4076 |
| 2022/0405882 A1* | 12/2022 | Ferrés .................. G06T 3/4046 |

FOREIGN PATENT DOCUMENTS

| | | | |
|---|---|---|---|
| CN | 110189253 A * | 8/2019 | ........... G06T 3/4023 |
| WO | WO 2018/217391 A1 | 11/2018 | |
| WO | WO 2020/041517 A1 | 2/2020 | |
| WO | WO 2020/062958 A1 | 4/2020 | |

OTHER PUBLICATIONS

International Search Report and Written Opinion, mailed Oct. 28, 2021, issued for International Patent Application PCT/EP2021/069019, 10 pages.

Rad et al., "Benefiting from bicubically down-sampled images for learning real-world image super-resolution," In *Proceedings of the IEEE/CVF Winter Conference on Applications of Computer Vision*, pp. 1590-1599, 2021.

Huyan et al., "Graph Based Neural Network Regression Strategy for Facial Image Super-Resolution," *Journal of Software*, Apr. 29, 2018, 914-925, 12 pages.

* cited by examiner

Images
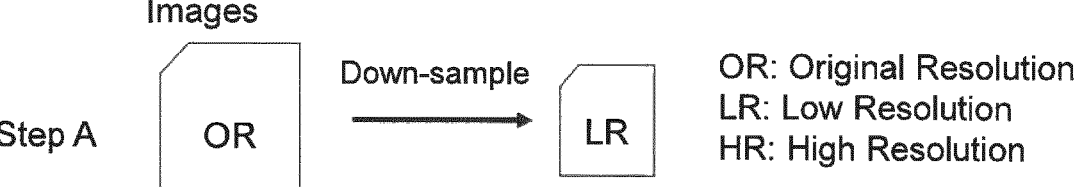
Step A
Down-sample
OR: Original Resolution
LR: Low Resolution
HR: High Resolution
Train an ANN model to recreate original images
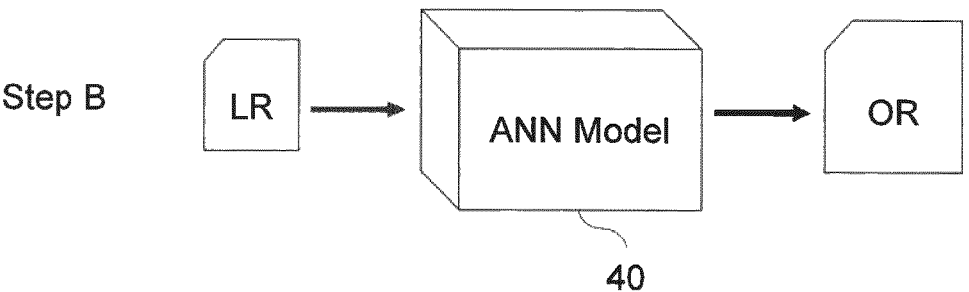
Step B
40
Use the trained ANN model to enhance original images
Step C
OR → ANN Model → HR
40
FIG 1

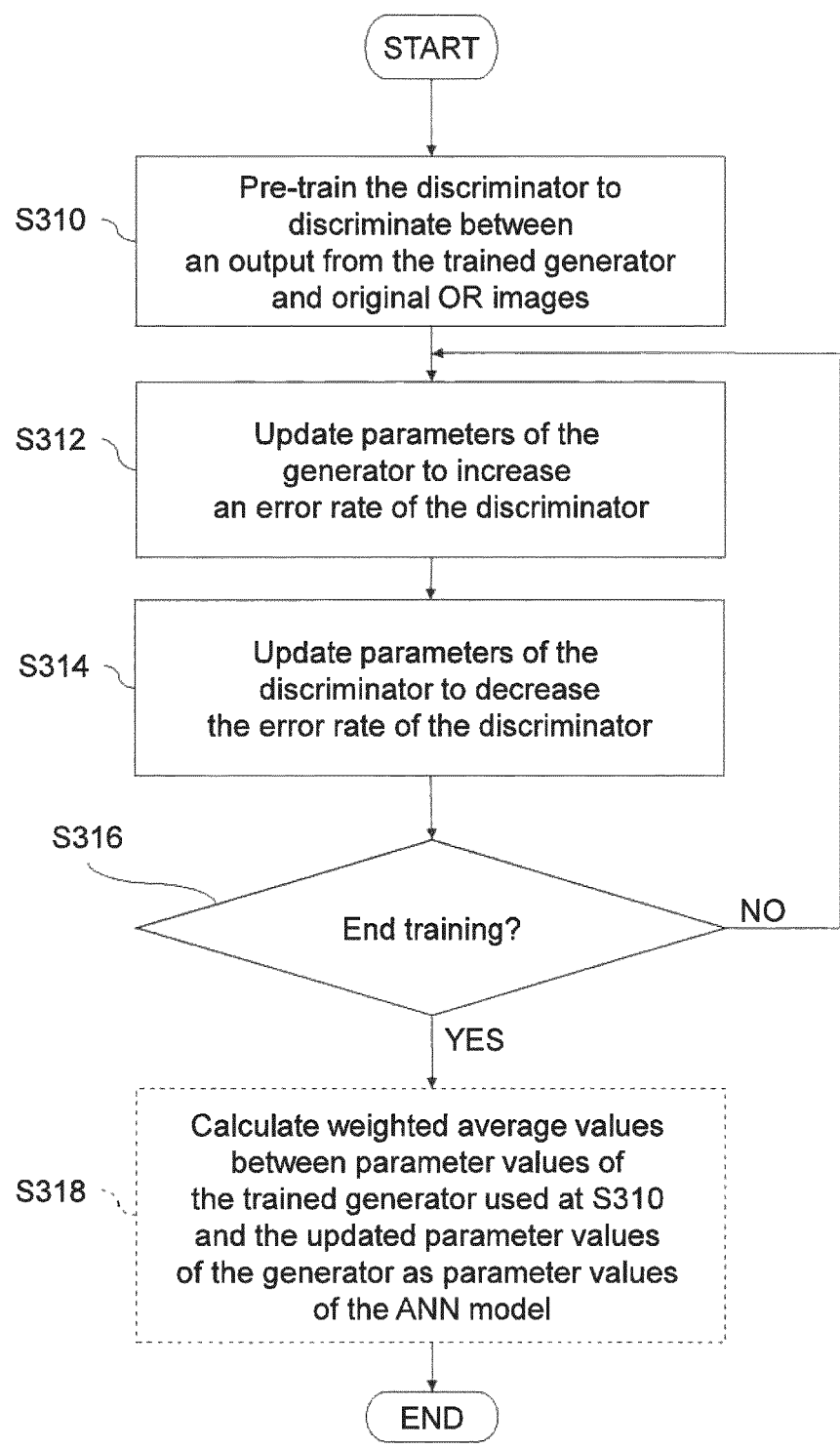

START

S310 — Pre-train the discriminator to discriminate between an output from the trained generator and original OR images S312 — Update parameters of the generator to increase an error rate of the discriminator S314 — Update parameters of the discriminator to decrease the error rate of the discriminator S316 — End training?

NO

YES

S318 — Calculate weighted average values between parameter values of the trained generator used at S310 and the updated parameter values of the generator as parameter values of the ANN model

END

FIG 6

Cells in FOV 4x        10x        20x

Image detail

FIG 11

COMPUTER-IMPLEMENTED METHOD, COMPUTER PROGRAM PRODUCT AND SYSTEM FOR PROCESSING IMAGES

CROSS REFERENCE TO RELATED APPLICATIONS

This is the U.S. National Stage of International Application No. PCT/EP2021/069019, filed Jul. 8, 2021, which was published in English under PCT Article 21(2), which in turn claims the benefit of European Patent Application No. 20 184 636.7, filed Jul. 8, 2020. The prior applications are incorporated herein by reference in their entirety.

The application relates to a computer-implemented method, a computer program product and a system for processing images.

BACKGROUND

The field of super-resolution (SR) aims to increase signal resolution to higher than the sensor resolution. In other words, it is aimed to approximate a signal using more sampling points, such as number of pixels in the case of a 2D image, or voxels in the case of 3D. The concept of SR may also be applied for 1D or 2D spectrums or any type of data for which spatial resolution is defined.

Several heuristic methods are available for achieving a higher resolution approximation. For example, methods commonly used for image up-sampling may include nearest neighbor interpolation, bilinear interpolation, bicubic interpolation, etc. In such methods, an interpolation of values may be derived from original pixel-values by applying up-sampling operations that is context-independent. For example, one such algorithm may include inserting a new pixel and assigning, to the new pixel, an average value of previously existing pixels around the new pixel. These heuristic methods often produce approximations which can be perceived as "pixelated" or "blurred" since an actual high-resolution (HR) version of the image may not look like those approximations. For instance, sharp lines might not remain sharp, as the missing pixels along the line edge might not have a value that is an interpolation between the line and the surrounding, but rather belong to either the line or the surrounding.

An alternative approach may be offered by the field of deep learning, where deep artificial neural network (ANN) models are trained to approximate HR versions of an input with high fidelity (see e.g., W. Yang, X. Zhang, Y. Tian, W. Wang, and J.-H. Xue, "Deep Learning for Single Image Super-Resolution: A Brief Review," IEEE Trans. Multimed., pp. 1-1, 2019). By using optimization algorithms, an ANN may be trained to do this up-sampling by updating its parameters in a way to improve approximations of the target HR image. For the training, a dataset of training samples may need to be provided. The training can either be supervised or unsupervised. In supervised training, the model may have access to HR versions of the input images the model is training to enhance (see e.g., C. Dong, C. C. Loy, K. He, and X. Tang, "Learning a Deep Convolutional Network for Image Super-Resolution," 2014.). In case of unsupervised training, the model may have access only to original resolution (OR) images (see e.g., WO 2019/102476 A2), or, in most cases, to HR images which are not the actual HR versions of the input images in the original resolution (see e.g., Y. Yuan, S. Liu, J. Zhang, Y. Zhang, C. Dong, and L. Lin, "Unsupervised Image Super-Resolution using Cyclein-Cycle Generative Adversarial Networks," *ArXiv*180900437 *Cs*, September 2018).

Compared to heuristic up-sampling techniques as stated above, up-sampling based on ANNs may be both domain and context aware. For example, the ANN model can learn to up-sample images of high complexity such as chessboards and areas of sharp lines in a different manner than images of clouds and areas with smooth lines. However, in known up-sampling methods based on ANNs, HR images are often required for training an ANN model, which are not always readily available.

SUMMARY

According to an aspect, the problem relates to facilitating image resolution extrapolation with improved quality. The problem is solved by the features disclosed by the independent claims. Further exemplary embodiments are defined by the dependent claims.

According to an aspect, a computer-implemented method is provided for processing images. The method comprises:

down-sampling a plurality of first images having a first resolution for obtaining a plurality of second images having a second resolution, the first resolution being higher than the second resolution, each one of the plurality of second images being a down-sampled version of one of the plurality of first images;

training an artificial neural network, ANN, model to process an input image and output an output image having a higher resolution than the input image, wherein training data for the training comprises pairs of images, each pair of images including:

one of the plurality of second images as an input to the ANN model; and one of the plurality of first images, corresponding to the one of the plurality of second images, as a desired output from the ANN model in case the one of the plurality of second images is input to the ANN model;

inputting at least one of the plurality of first images to the trained ANN model; and obtaining at least one output image from the trained ANN model, the at least one output image having a third resolution that is higher than the first resolution.

In the present disclosure, the term "image" may be understood as data for which spatial resolution is defined. For example, an "image" may be a 2D digital image including pixels or a 3D digital image including voxels. In such an example, each of the pixels or voxels in the image may indicate intensity or gray level. In other examples, an "image" may be 1D or 2D spectra.

In various embodiments and examples described herein, the "ANN model" may comprise an ANN, wherein operations of the ANN are not dependent on the resolution of input data and output data. In other words, the ANN model may comprise an ANN that is capable of processing input data with different resolutions and of outputting data with different resolutions.

The method according to the above-stated aspect may enable generating an image with a target resolution (e.g., third resolution) that is higher than that of an image input to the ANN model, without using images having the target resolution for training the ANN model. Further, the use of the ANN model may improve quality of the obtained image with the target resolution as compared to using known heuristic methods such as nearest neighbor interpolation or bicubic interpolation.

In the method according to the above-stated aspect, the ANN model may comprise a convolutional neural network.

Further, in the method according to the above-stated aspect, the ANN model may comprise:

a generator comprising a first ANN for processing the input image and outputting the output image having the higher resolution than the input image; and a discriminator comprising a second ANN for discriminating images generated by the first ANN from real images that are considered as desired outputs from the first ANN, wherein the ANN model may be trained by:

training the generator, using the training data, to generate, from the input image, the output image having the higher resolution than the input image;

training the discriminator, using images output from the trained generator and at least some of the plurality of first images, to determine whether an image input to the second ANN is:

an image output from the trained generator; or one of the plurality of first images;

further training the generator and the discriminator by iterating the following steps:

updating, using an output from the trained discriminator, parameter values of the first ANN to increase an error rate of the second ANN; and updating, using an output from the trained generator, parameter values of the second ANN to decrease the error rate of the second ANN.

In the present disclosure, the term "parameter values" of an ANN may be understood as values of parameters that are used in operations performed at the ANN. For example, the "parameter values" may include values of weights of connections between nodes in the ANN.

In the exemplary embodiments where the ANN model comprises the generator and the discriminator, the first ANN and/or the second ANN may be a convolutional neural network.

Further, in the exemplary embodiments where the ANN model comprises the generator and the discriminator, the method may further comprise:

calculating weighted average values between:

the parameter values of the first ANN obtained with the step of training the generator; and the updated parameter values of the first ANN obtained with the step of further training the generator and the discriminator, wherein the first ANN having the weighted average values as the parameter values may be used as the trained ANN model for obtaining the at least one output image.

Further, any one of the method according to the above-stated aspect and various embodiments thereof may further comprise:

applying an image augmentation pre-processing step to the plurality of first images before the down-sampling of the plurality of first images, wherein the image augmentation pre-processing step may include one or more of the following:

blurring;

adding pixel-wise noise;

applying out-of-focus distortion;

applying motion blur.

Performing the image augmentation pre-processing step may increase ability of the ANN model to robustly increase image resolution.

Further, in the method according to any one of the above-stated aspect and various embodiments thereof, the first resolution may be higher than the second resolution by a scaling factor (S) and the third resolution may be higher than the first resolution by the scaling factor (S).

In various aspects and embodiments described herein, the scaling factor (S) may be a real number with a value greater than 1.0. In some exemplary embodiments, the scaling factor (S) may be a value between 2.0 to 4.0. In further exemplary embodiments, the scaling factor (S) may be a value greater than 4.0.

In various aspects and embodiments described herein, the plurality of first images may comprise microscopic images of cells. In case the plurality of first images comprise microscopic images of cells, it may be preferable to set the scaling factor (S) to a value smaller than 3.0, and, in some circumstances, to a value equal to or smaller than 2.0.

According to another aspect, a computer program product is provided. The computer program product comprises computer-readable instructions that, when loaded and run on a computer, cause the computer to perform the method according to any one of the above-stated aspect and various embodiments thereof.

According to yet another aspect, a system is provided for processing images. The system comprises:

a storage medium storing a plurality of first images having a first resolution and an artificial neural network, ANN, model for processing an input image to output an output image having a higher resolution than the input image; and a processor configured to:

down-sample the plurality of first images for obtaining a plurality of second images having a second resolution, the first resolution being higher than the second resolution, each one of the plurality of second images being a down-sampled version of one of the plurality of first images;

train the ANN model using training data that comprises pairs of images, each pair of images including:

one of the plurality of second images as an input to the ANN model; and one of the plurality of first images, corresponding to the one of the plurality of second images, as a desired output from the ANN model in case the one of the plurality of second images is input to the ANN model;

input at least one of the plurality of first images to the trained ANN model; and obtain at least one output image from the trained ANN model, the at least one output image having a third resolution that is higher than the first resolution.

In the system according to the above-stated aspect, the ANN model may comprise a convolutional neural network.

Further, in the system according to the above-stated aspect, the ANN model may comprise:

a generator comprising a first ANN for processing the input image and outputting the output image having the higher resolution than the input image; and a discriminator comprising a second ANN for discriminating images generated by the first ANN from real images that are considered as desired outputs from the first ANN, wherein the ANN model may be trained by:

training the generator, using the training data, to generate, from the input image, the output image having the higher resolution than the input image;

training the discriminator, using images output from the trained generator and at least some of the plurality of first images, to determine whether an image input to the second ANN is:

an image output from the trained generator; or one of the plurality of first images;

further training the generator and the discriminator by iterating the following steps:

updating, using an output from the trained discriminator, parameter values of the first ANN to increase an error rate of the second ANN; and updating, using an output from the trained generator, parameter values of the second ANN to decrease the error rate of the second ANN.

Further, in case the ANN model comprises the generator and the discriminator, the processor may be further configured to:

calculate weighted average values between:

the parameter values of the first ANN obtained with the step of training the generator; and the updated parameter values of the first ANN obtained with the step of further training the generator and the discriminator, wherein the first ANN having the weighted average values as the parameter values may be used as the trained ANN model for obtaining the at least one output image.

In the system according to any one of the above-stated aspect and various embodiments thereof, the processor may be further configured to:

apply an image augmentation pre-processing step to the plurality of first images before the down-sampling of the plurality of first images, wherein the image augmentation pre-processing step may include one or more of:

blurring;

adding pixel-wise noise;

applying out-of-focus distortion;

applying motion blur.

Further, in the system according to any one of the above-stated aspect and various embodiments thereof, the first resolution may be higher than the second resolution by a scaling factor (S) and the third resolution may be higher than the first resolution by the scaling factor (S).

In the system according to any one of the above-stated aspect and various embodiments thereof, the plurality of first images may comprise microscopic images of cells.

The subject matter described in the application can be implemented as a method or as a system, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. In some examples, the system may be a general purpose computer system. In other examples, the system may be a special purpose computer system including an embedded system.

In some circumstances, any one of the above stated aspects as well as any one of various embodiments and examples described herein may provide one or more of the following advantages:

achieving increased quality of the image resolution extrapolation as compared to heuristic methods such as nearest neighbor interpolation or bicubic interpolation;

eliminating need of using images of a target resolution (e.g., high resolution) in the training process as may be the case with known deep learning methods;

facilitating and/or providing improvements in further processing of images such as cell-segmentation by achieving the increased image quality.

BRIEF DESCRIPTION OF THE DRAWINGS

Details of one or more implementations are set forth in the exemplary drawings and description below. Other features will be apparent from the description, the drawings, and from the claims. It should be understood, however, that even though embodiments are separately described, single features of different embodiments may be combined to further embodiments.

FIG. 1 shows a schematic, conceptual diagram illustrating a method according to the present disclosure.

FIG. 6 shows a flowchart showing an exemplary process for training the exemplary ANN model shown in FIG. 5.

FIG. 11 shows a conceptual diagram illustrating the relationship among magnifications, the number of cells in a field of view and image detail in live cell imaging.

DETAILED DESCRIPTION OF EMBODIMENTS

Figure 2:
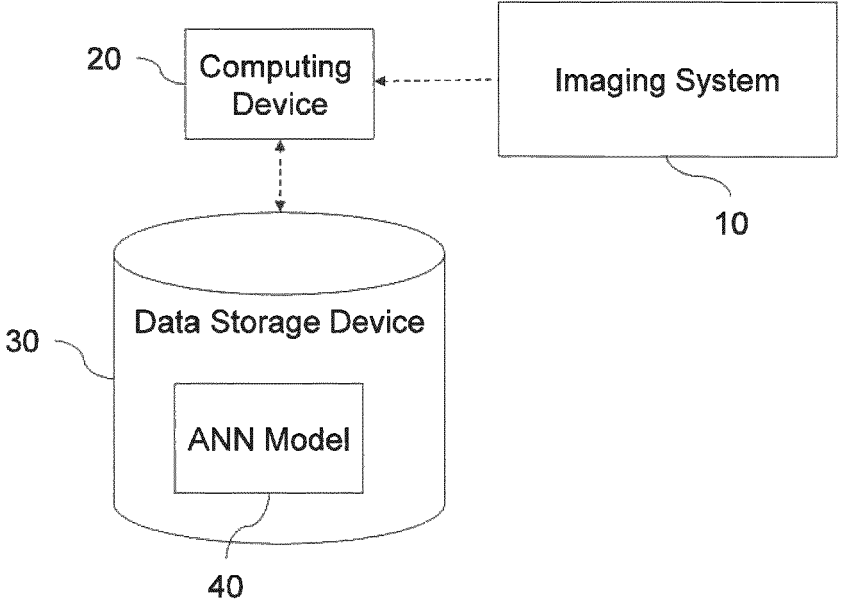
FIG. 2 shows a schematic diagram of an exemplary system for processing images.

In the following text, a detailed description of examples will be given with reference to the drawings. It should be understood that various modifications to the examples may be made. In particular, one or more elements of one example may be combined and used in other examples to form new examples.

Although the exemplary embodiments will be described in the following with regards to processing 2D images, it should be noted that various aspects and exemplary embodiments may be applicable to other types of data for which spatial resolutions can be defined. Examples of the other types of data may include, but are not limited to, 3D images, 1D and/or 2D spectra, etc.

Signal quality may be central to all analytics. In the context of image analytics, image quality and resolution may define, both perceptually and algorithmically, what information to extract from the image and/or how easy it is to extract the information. For example, it may be easier to see what is in a high-resolution clear image compared to a low-resolution blurred image. Accordingly, the simplest way to improve the quality of down-stream analysis of a given problem, may be to enhance the quality of the signal used for analysis. Various aspects and exemplary embodiments described herein may provide enhancement of an input signal in a qualitative manner.

ANN's are commonly used to increase the resolution of images (see e.g., W. Yang, X. Zhang, Y. Tian, W. Wang, and J.-H. Xue, "Deep Learning for Single Image Super-Resolution: A Brief Review," IEEE Trans. Multimed., pp. 1-1, 2019; C. Dong, C. C. Loy, K. He, and X. Tang, "Learning a Deep Convolutional Network for Image Super-Resolution," 2014; B. Lim, S. Son, H. Kim, S. Nah, and K. M. Lee, "Enhanced Deep Residual Networks for Single Image Super-Resolution," *ArXiv*170702921 *Cs*, July 2017). The methods used today, however, often rely on high resolution images to train the networks, either with low-resolution (LR)-HR image pairs or by providing unpaired LR and HR images of the same domain as in the case with generative adversarial networks (GAN) (see e.g, Y. Yuan, S. Liu, J. Zhang, Y. Zhang, C. Dong, and L. Lin, "Unsupervised Image Super-Resolution using Cycle-in-Cycle Generative Adversarial Networks," *ArXiv*180900437 *Cs*, September 2018).

Various aspects and exemplary embodiments as described herein can increase the resolution of images without the need of any HR images involved in the training process.

FIG. 1 shows a schematic, conceptual diagram illustrating a method according to the present disclosure. Referring to step A shown in FIG. 1, in some exemplary embodiments, images with an original resolution (e.g., first resolution) may be down-sampled to images with a low resolution (e.g., second resolution). Hereinafter, images with the original resolution may also be referred to as "OR images" and images with the low resolution may also be referred to as "LR images". The down-sampling may be performed by bicubic interpolation, for example. Subsequently, referring to step B shown in FIG. 1, an ANN model 40 may be trained to reproduce the OR images from the LR images. The ANN model 40 may comprise an ANN, for example, a Convolutional Neural Network (CNN) architecture for image processing (see e.g., A. Krizhevsky, I. Sutskever, and G. Hinton, "ImageNet Classification with Deep Convolutional Neural Networks," *Neural Inf. Process. Syst.*, vol. 25, January 2012). Once the training is completed, as shown in step C of FIG. 1, the ANN model 40 with operations learned from up-sampling the LR images to the OR images can be used to enhance the OR images to images with a high resolution (e.g., third resolution that is higher than the original resolution), in other words, increase the image resolution from the original resolution to the high resolution. Hereinafter, images with the high resolution may also be referred to as "HR images".

System Configuration

FIG. 2 shows a schematic diagram of an exemplary system for image processing. The exemplary system shown in FIG. 2 comprises an imaging system 10, a computing device 20 and a data storage device 30.

The imaging system 10 may be configured to capture images and provide the captured images to the computing system 20. The images may be, for example, natural images of one or more scenes. In some circumstances, the images may be microscopic images of cells, in which case the imaging system 10 may comprise a microscopic imaging device (not shown) such as a light microscope, a fluorescence microscope or an electron microscope.

The computing device 20 may be a computer connected to the imaging system 10 via (a) wired and/or wireless communication network(s). The computing device 10 may receive the images captured by the imaging system 10. The computing device 20 may be configured to perform a method according to various embodiments and examples described herein. The data storage device 30 may store information that is used by the computing device 20 and/or information that is generated by the computing device 20. For example, the storage device 30 may store the ANN model 40 (see e.g., FIG. 1) used in a method according to various embodiments and examples described herein It is noted that the imaging system 10, the computing device 20 and the data storage device 30 may either be incorporated into a single device with one body or implemented with more than one separate devices. Further, the computing device 20 may be implemented with more than one computer connected to each other via (a) wired and/or wireless communication network(s).

In some exemplary embodiments, the computing device 20 does not necessarily receive the images to be processed directly from the imaging system 10 that has captured the images. For example, the computing device 20 may receive the captured images from a database system (not shown) which stores the images captured by the imaging system 10.

Unsupervised Image Enhancement

Figure 3:
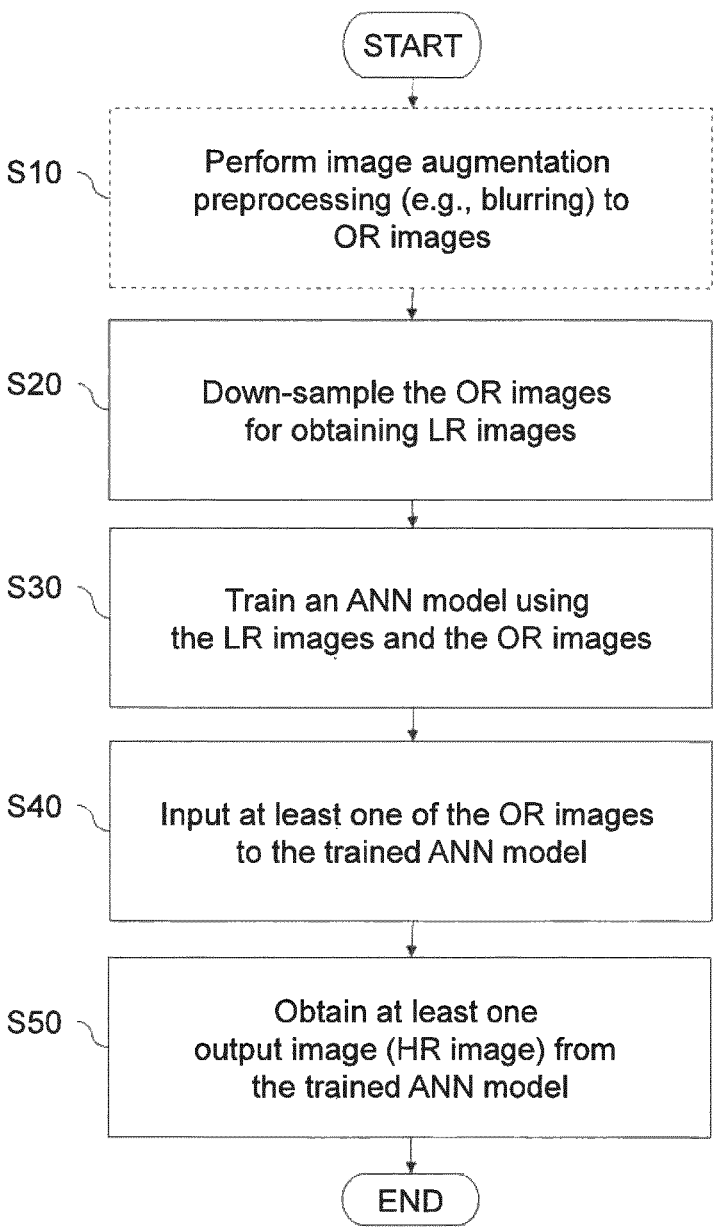
FIG. 3 shows a flowchart showing an exemplary process performed by the system shown in FIG. 2.

FIG. 3 shows a flowchart showing an exemplary process performed by the system shown in FIG. 2. The exemplary process may be performed by the computing device 20 shown in FIG. 2. The exemplary process may start, for example, when the computing device 20 receives, via an input device (not shown), an instruction from a user to start the exemplary process.

In step S10, the computing device 20 may optionally perform image augmentation preprocessing to OR images. The image augmentation preprocessing may, for example, include one or more of: blurring, adding pixel-wise noise, applying out-of-focus distortion, applying motion blur, etc. The OR images may have been provided (directly or indirectly) from the imaging system 10 and stored in the data storage device 30. The process may proceed to step S20 after step S10. It is noted that step S10 is an optional step that may be skipped. In case step S10 is skipped, the process may start with step S20.

In step S20, the computing device 20 may down-sample the OR images (e.g., that have been stored in the data storage device 30 as stated above) for obtaining LR images. The down-sampling may be made with bicubic interpolation, for example. Each of the LR images obtained in step S20 may be a down-sampled version of one of the OR images. The process may proceed to step S30 after step S20.

In step S30, the computing device 20 may train an ANN model, for example, the ANN model 40 shown in FIGS. 1 and 2, using the LR images and the OR images. Training data for the training in step S30 may comprise pairs of images, where each pair of images may include one of the LR images as an input to the ANN model 40 and a corresponding one of the OR images as a desired output from the ANN model 40 in case said one of the LR images is input to the ANN model 40.

Figure 4:
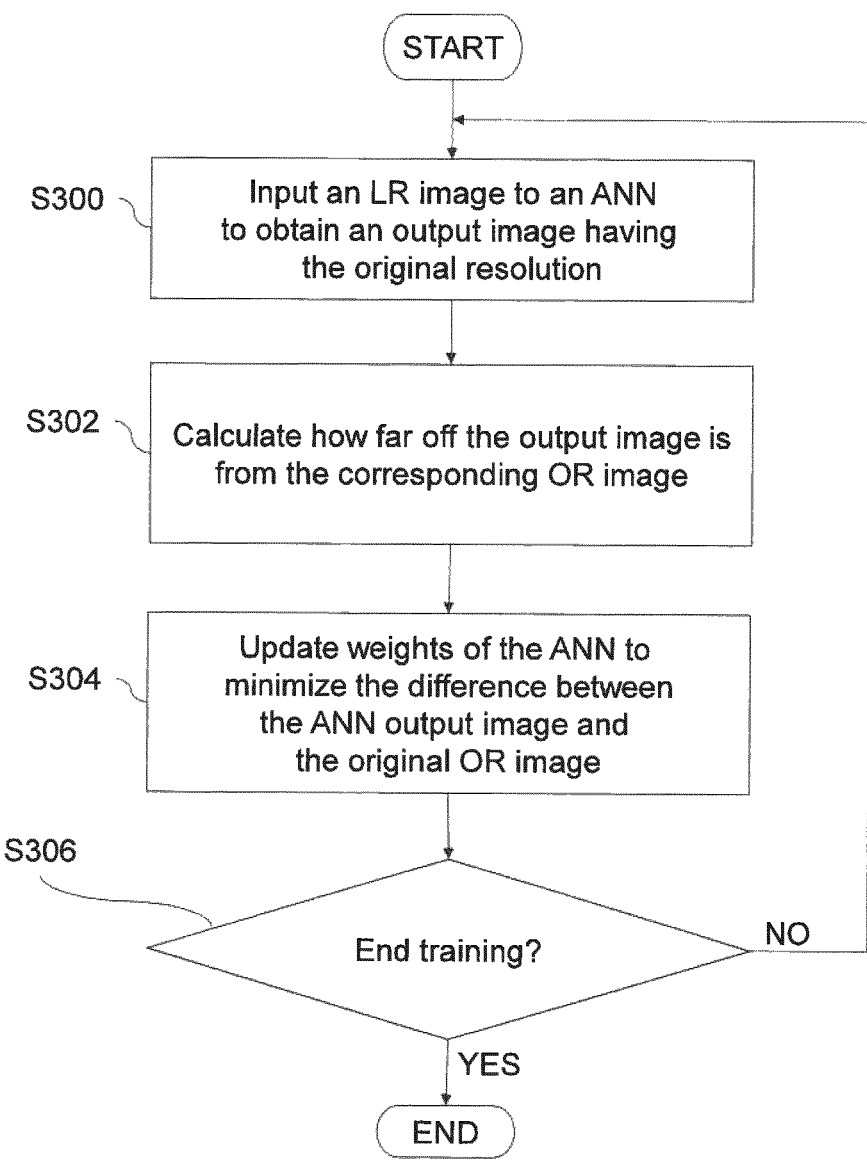
FIG. 4 shows a flowchart showing an exemplary process for training an ANN model in the present disclosure.

FIG. 4 shows a flowchart showing an example of more detailed process of the training in step S30 of FIG. 3. When the computing device 20 starts performing step S30 of FIG. 3, the exemplary process of FIG. 4 may be started.

Referring to FIG. 4, in step S300, an LR image from the training data may be input to an ANN of the ANN model 40 to obtain an output image having the original resolution. After step S300, the process may proceed to step S302.

In step S302, the computing device 20 may calculate how far off the output image is from the corresponding OR image. This metric may be, for example, calculated with pixelwise mean absolute error (MAE), or mean square error (MSE). This metric may be referred to as a "loss" in the field of deep learning. After step S302, the process may proceed to step S304.

In step S304, the computing device 20 may update weights of the ANN to minimize the difference between the ANN output image and the original OR image. In other words, the weights of the ANN may be updated to minimize the loss calculated in step S302. More specifically, for example, the update of the weights may be performed using a variant of gradient descent (e.g., stochastic, batch or mini-batch gradient decent) and a backward propagation algorithm with regards to current network weights, activations and the calculated loss in order to minimize the difference between the ANN output image and the original OR image.

After step S304, the computing device 20 may determine, in step S306, whether or not to end the training process. For example, the determination in step S306 may be based on whether or not the iterations of the training steps S300, S302 and S304 has reached a specified number. Alternatively or additionally, the determination in step S306 may be based on whether or not the loss of the ANN has converged. In case the specified number of iterations is reached and/or the loss of the ANN has converged, the computing device 20 may determine to end the training process. If not, the computing device 20 may determine to continue performing the training process.

When the computing device 20 determines to continue the training process (NO in step S306), the process may return to step S300. When the computing device 20 determines to end the training process (YES in step S306), the process shown in FIG. 4 may end.

After the training process shown in FIG. 4 ends, step S30 of FIG. 3 may end and the computing device 20 may proceed to perform step S40 of FIG. 3.

Referring again to FIG. 3, in step S40, the computing device 20 may input at least one of the OR images (e.g., stored in the data storage device 30) to the trained ANN model 40. The at least one of the OR images may be enhanced to the target resolution higher than the original resolution by the ANN model 40 and at least one HR image corresponding to the at least one of the OR images may be output from the ANN model 40.

In step S50, the computing device 20 may obtain the at least one HR image from the trained ANN model. The HR image(s) output from the trained ANN model may have increased quality (e.g., resolution) as compared to the OR image(s) input to the ANN model.

The process shown in FIG. 3 may end after step S50.

In the exemplary process shown in FIG. 3, steps S10 and S20 may correspond to step A of FIG. 1 and steps S30 may correspond to step B of FIG. 1. Further, steps S40 and S50 of FIG. 3 may correspond to step C of FIG. 1.

In some exemplary embodiments, the ANN model 40 may be configured and trained according to generative adversarial network (GAN) methodology (see e.g., Goodfellow, Ian; Pouget-Abadie, Jean; Mirza, Mehdi; Xu, Bing; Warde-Farley, David; Ozair, Sherjil; Courville, Aaron; Bengio, Yoshua, "Generative Adversarial Networks", Proceedings of the International Conference on Neural Information Processing Systems (NIPS 2014). pp. 2672-2680., available online at: https://arxiv.org/abs/1406.2661). In such exemplary embodiments, the ANN model 40 may be configured and trained as will be described below with reference to FIGS. 5 and 6.

Figure 5:
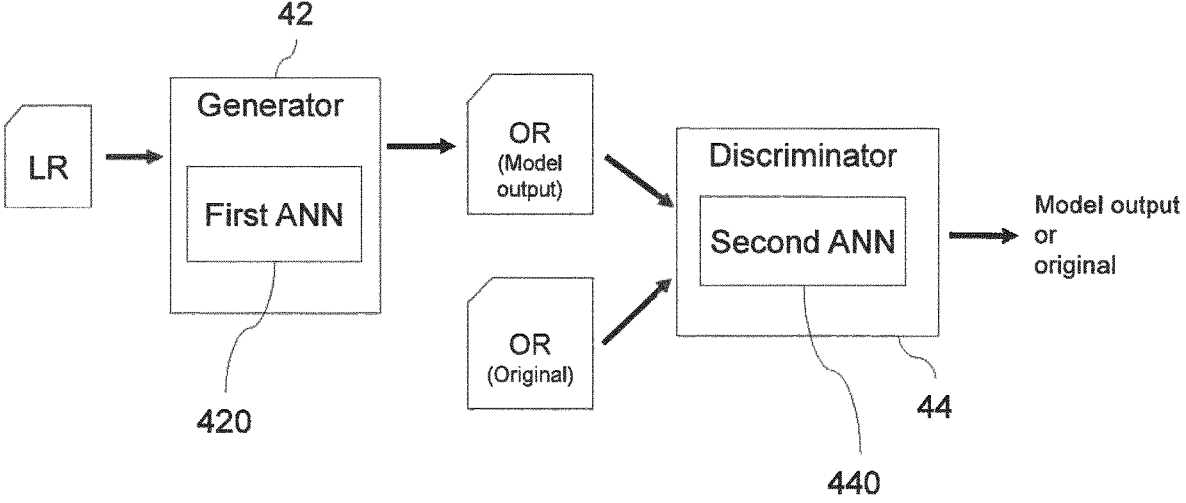
FIG. 5 shows a schematic diagram illustrating an exemplary ANN model according to generative adversarial network (GAN) methodology.

FIG. 5 shows an exemplary configuration of the ANN model 40 in the exemplary embodiments where GAN methodology is employed for the ANN model 40.

Referring to FIG. 5, the ANN model 40 may comprise a generator 42 having a first ANN 420 and a discriminator 44 having a second ANN 440.

The first ANN 420 of the generator 42 may be for processing an input image and outputting an output image having a higher resolution than the input image. The first ANN 420 may be a CNN and may be trained in the same manner as in the exemplary training process shown in FIG. 4.

The second ANN 440 of the discriminator 44 may be for discriminating images generated by the first ANN 420 from real images that are considered as desired outputs from the first ANN 420. In other words, the purpose of the discriminator 44 with the second ANN 440 may be to classify whether an input fed to the discriminator 44 is real or synthetic. The second ANN 440 may be a CNN.

As can be seen from FIG. 5, LR images may be input to the generator 42, processed with the first ANN 420 and then OR images may be output from the generator 42. These OR images output from the generator 42 and original OR images, in other words, the OR images from which the LR images have been generated by down-sampling, may be used for training the discriminator 44 to determine whether an input to the discriminator 44 is an output from the generator 42 or an original OR image.

FIG. 6 shows a flowchart of an exemplary training process of the ANN model 40 comprising the generator 42 and the discriminator 44. The process shown in FIG. 6 may be performed by the computing device 20 as part of the training step S30 shown in FIG. 3, for example. Further, in some circumstances, the generator 42 may be trained with the exemplary process shown in FIG. 4 before starting the exemplary process shown in FIG. 6.

Referring to FIG. 6, in step S310, the computing device may pre-train the discriminator 44 to discriminate between outputs from the generator 42 and original OR images. For example, OR images output from the generator 42 and original OR images corresponding to LR images input to the generator 42 for obtaining the OR images may be used as training data for the pre-training in step S310 (see also FIG. 5). After step S310, the process may proceed to step S312.

In step S312, the computing device 20 may update, using an output from the trained discriminator 44, parameter values of the first ANN 420 of the generator 42 to increase an error rate of the second ANN 440 of the discriminator 44.

In other words, the parameter values of the first ANN 420 may be updated to make the discriminator 44 less correct. After step S312, the process may proceed to step S314.

In step S314, the computing device 20 may update, using an output from the trained generator 42 (with the updated parameter values in step S312), parameter values of the second ANN 440 of the discriminator 44 to decrease the error rate of the second ANN 440. In other words, the parameter values of the second ANN 440 may be updated to make it more difficult for the generator 42 to create an output which the discriminator 44 is unable to discriminate from the original image. After step S314, the process may proceed to step S316.

In step S316, the computing device 20 may determine whether or not to end the training process. For example, the computing device 20 may determine whether or not one or more conditions are met for ending the training process. The one or more conditions may include, for example, whether the updating steps S312 and S314 have been iterated for a specified number of times, whether metrics used for the updating steps S312 and/or S314 has/have converged, etc. Alternatively or additionally, in some circumstances, the one or more conditions may include convergence of a secondary metric other than the metrics used for the updating steps S312 and/or S314, for example, Peak Signal to Noise Ratio (PSNR). In case the one or more conditions for ending the training process is met, the computing device 20 may determine to end the training process. If not, the computing device 20 may determine to continue the training process.

When the computing device 20 determines to continue the training process (NO in step S316), the process may return to step S312 and the updating steps S312 and S314 may be iterated. When the computing device 20 determines to end the training process (YES in step S316), the process may proceed to step S318.

In step S318, the computing device 20 may optionally calculate weighted average values between parameter values of the trained generator 42 used at S310 and the updated parameter values of the generator 42 after the computing device 20 determines to end the training process in step S316. The first ANN 420 having the calculated weighted average values may be used as the ANN model 40 to generate HR images from the OR images. It is noted that step S318 is an optional step that may be skipped.

After it is determined YES in step S316 or after step S318, the process shown in FIG. 6 may end.

In the exemplary embodiments where the ANN model 40 is trained with the exemplary process shown in FIG. 6, the first ANN 420 of the generator 42 with the parameter values as the result of performing the training process of FIG. 6 may be employed as the ANN of the ANN model 40 for generating HR images from OR images (see also, e.g., step S50 of FIG. 3).

In the exemplary embodiments according to the GAN methodology as described above with reference to FIGS. 5 and 6, it may be understood that the first ANN 420 of the generator 420 is further fine-tuned with the training process shown in FIG. 6 after being trained, e.g., with the training process as shown in FIG. 4.

The image enhancement process as described above with reference to FIGS. 1 to 6 may be considered as unsupervised and/or self-supervised method in the sense that HR images with the target resolution are not required for training the ANN model 40.

Experiments

The following provides settings and results of experiments carried out by the inventors for a method according to the present disclosure. In the experiments, ANN models were trained on different resolution scales (2×, 3×, and 4×) and different down sampling methods were tested.

a) Dataset

Two different datasets were used for the experiments:
a natural image dataset consisting of 900 from the DIV2K dataset (see e.g., R. Timofte, S. Gu, L. Van Gool, L. Zhang, and M.-H. Yang, "NTIRE 2018 Challenge on Single Image Super-Resolution: Methods and Results," in 2018 IEEE/CVF Conference on Computer Vision and Pattern Recognition Workshops (CVPRW), June 2018, pp. 965-96511, doi: 10.1109/ CVPRW.2018.00130; E. Agustsson and R. Timofte, "NTIRE 2017 Challenge on Single Image Super-Resolution: Dataset and Study," in 2017 IEEE Conference on Computer Vision and Pattern Recognition Workshops (CVPRW), Honolulu, HI, USA, July 2017, pp. 1122-1131, doi: 10.1109/CVPRW.2017.150); and
a cell-microscopy image dataset with 3816 images captured by the IncuCyte® S3 at 10× magnification.

The DIV2K dataset was divided into 750 training images, 50 validation and 100 test images. The cell-microscopy image dataset was divided into 2124 training images, 531 validation and 1160 test images.

b) Experimental Setups

The experimental setups were different for the two datasets, natural image dataset and the cell-microscopy image dataset. For the general workflow, it was assumed that images in original resolution (OR) were available with the goal of improving the OR images to high resolution (HR) without having access to actual HR images. If the magnitude of the resolution improvement from OR to HR is denoted by the scaling factor S, then an equivalent downscaling (in other words, down-sampling) by the factor of S was done to OR images to acquire LR images. The ANN models were trained to recreate OR images from the LR images and then used for extrapolating data in the OR images to HR.

For the cell-microscopy image dataset, three ANN models were trained, and the extrapolation step was compared with a bicubic interpolation (BI) upscaling. The ANN models were trained for with scaling factors of 2×, 3× and 4× with nearest neighbor (NN) downscaling for the LR creation.

For the natural images (DIV2K), a slightly different approach was taken. Instead of using the original images as the OR resolution, the original images of the DIV2K dataset were downscaled with BI to create a downscaled OR dataset. The downscaled OR images were used as the OR images for training the ANN model. Once the ANN model was fully trained, the ANN model was used to upscale the downscaled OR test images to HR images. Peak Signal to Noise Ratio (PSNR) and Mean Absolut Error (MAE) were calculated between the extrapolated HR images that were output from the ANN model and the ground truth HR images that are the original images in the DIV2K dataset. This evaluation method can create the possibility to get comparable metrics. The information loss for the LR images, however, may become significant as the scaling factor S increases, which may make it more difficult to train the ANN model. When the original images are considered as images having the target resolution HR, then the low resolution LR for the training input images may be $LR=HR/S^2$. Accordingly, the original images had to be downscaled by a factor or 16 in order to obtain LR images for an ANN model that increases the resolution by a factor of four.

A ResNet network called enhanced deep super-resolution network (EDSR) (see e.g., B. Lim, S. Son, H. Kim, S. Nah, and K. M. Lee, "Enhanced Deep Residual Networks for Single Image Super-Resolution", July 2017, available online at: https://arxiv.org/abs/1707.02921) was employed as the architecture for the ANN models in the experiments.

Figure 7:
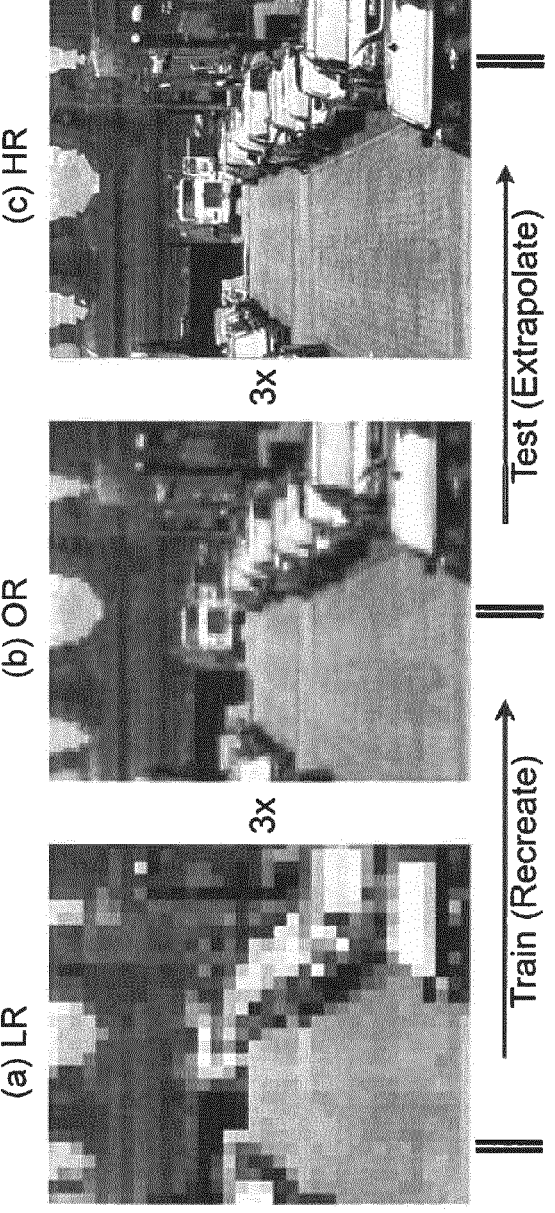
FIG. 7 shows exemplary visualization of training and evaluation steps with natural images.

FIG. 7 shows an exemplary visualization of the different resolutions for an ANN model with the scaling factor S=3. More specifically, FIG. 7 shows an exemplary visualization of training and evaluation steps with natural images with an ANN model that increases the image resolution by three times. The original HR images were downscaled to the simulated OR images which were further downscaled to LR images for training purposes.

For the DIV2K image dataset, six different experiments were run: for each of scaling factors S=2, 3, and 4, one ANN model with BI downscaling and one ANN model with NN downscaling. In addition, for each combination of the scaling factor and the downscaling method, a non-converged version of the ANN model was saved after 50 epochs, resulting in a total of 12 ANN models.

In all experiments, the ANN models were trained for 1000 epochs with a learning rate of $2e^{-4}$, minimizing MAE loss using the Adam optimizer (see e.g., D. P. Kingma and J. Ba, "Adam: A method for stochastic optimization," ArXiv Prepr. ArXiv14126980, 2014). For the cell-microscopy dataset, the ANN models used a batch size of five and for the DIV2K image dataset, the ANN models used a batch size of 12.

c) Results

Table 1 shows results of Peak Signal to Noise Ratio (PSNR) of the ANN models according to the present disclosure as well as comparative examples of non-converged models and the known heuristic methods, BI and NN. In Table 1, the indications of BI and NN for the ANN models and non-converged models represent the downscaling method, while the indications of BI and NN in the heuristic methods represent the up-scaling method. The term "non-converged models" in Table 1 is to be understood as non-converged version of the ANN model trained for 50 epochs. PSNR was computed between extrapolated high-resolution images and corresponding ground truth image.

TABLE 1

| PSNR | ANN models | | Heuristic methods | | Non-converged models | |
|---|---|---|---|---|---|---|
| Scale | BI | NN | BI | NN | BI | NN |
| 2× | 35.06 | 35.17 | 33.94 | 34.05 | 34.41 | 33.89 |
| 3× | 33.47 | 33.50 | 33.16 | 33.08 | 32.68 | 32.84 |
| 4× | 32.80 | 32.68 | 32.36 | 32.41 | 32.06 | 31.44 |

As can be seen from Table 1, in terms of PSNR (the higher, the better), the ANN models according to the present disclosure outperform the known heuristic methods, BI and NN, as well as the non-converged models. There seems, however, to be no clear difference between the fully converged models due to which downscaling method is used. The results of the Mean Absolute Error (MAE) metrics shown in Table 2 below also follows the same pattern.

TABLE 2

| MAE | ANN models | | Heuristic methods | | Non-converged models | |
|---|---|---|---|---|---|---|
| Scale | BI | NN | BI | NN | BI | NN |
| 2× | 4.41 | 4.34 | 5.75 | 5.59 | 4.93 | 5.31 |
| 3× | 6.45 | 6.41 | 7.01 | 7.20 | 7.37 | 7.27 |
| 4× | 7.65 | 7.79 | 8.58 | 8.61 | 8.58 | 9.27 |

Table 2 shows MAE comparison of the ANN models according to the present disclosure as well as comparative examples of non-converged models and the known heuristic methods, BI and NN. The error was computed as the mean absolute pixel difference between the extrapolated high resolution image and corresponding ground truth image. Also in Table 2, the indications of BI and NN for the ANN models and non-converged models represent the downscaling method, while the indications of BI and NN in the heuristic methods represent the up-scaling method. Further, the term "non-converged models" in Table 2 is to be understood as non-converged version of the ANN model trained for 50 epochs.

Figure 8:
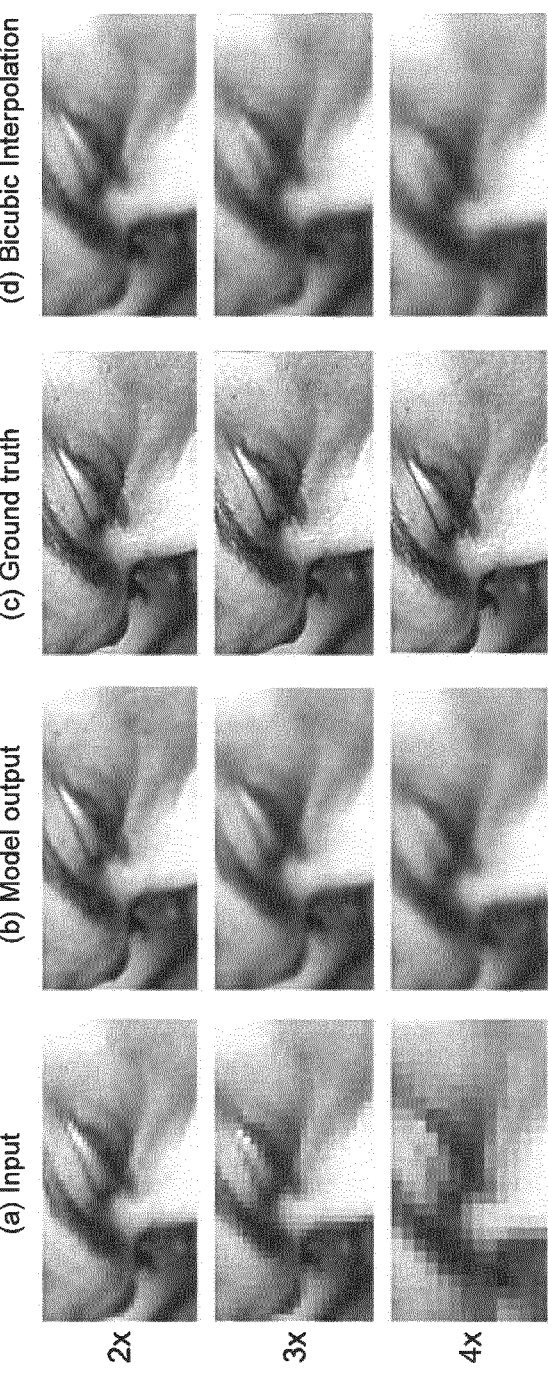
FIG. 8 shows examples of natural images for comparison of images obtained by a method according to the present disclosure and by bicubic interpolation.

FIG. 8 shows examples of natural images for comparison of images obtained from the ANN models according to the present disclosure and by bicubic interpolation (BI). FIG. 8 shows exemplary outputs from the ANN models trained on 2×, 3× and 4× resolution increase (corresponding to the image rows in FIG. 8). In FIG. 8, the images in column (a) are the input images, column (b) are output images from the ANN models, column (c) are the ground truth images and column (d) are the resulting images with BI upscaling. The ANN models had the input images shown in column (a) of FIG. 8 as OR input images and increased the resolution to HR by the respective scaling factors. In comparison with the BI upscaling, the output images of the ANN models appear sharper and thus resemble the ground truth image better. As the input resolution decreases, so does the ability to recreate the ground truth HR image.

Figure 9:
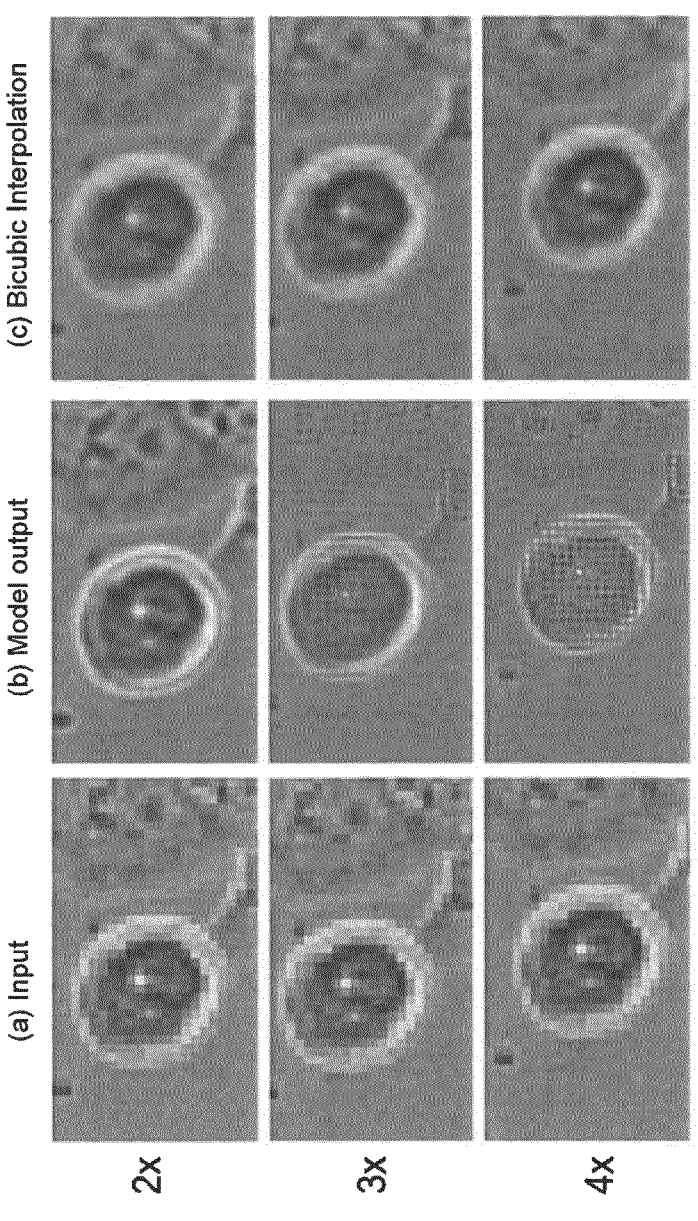
FIG. 9 shows examples of cell images for comparison of images obtained by a method according to the present disclosure and by bicubic interpolation.

FIG. 9 shows examples of cell images for comparison of images obtained from the ANN models according to the present disclosure and by bicubic interpolation. The image rows in FIG. 9 correspond to the resolution increases, 2×, 3× and 4× (in other words, scaling factors 2, 3 and 4). In FIG. 9, the images in column (a) show input images, column (b) show output images from the ANN models and column (c) show images upscaled with the BI upscaling as comparative examples.

As can be seen from FIG. 9, the cell microscopy image quality was clearly improved with the ANN model when using a resolution increase of 2× when compared to the input image and resolution increase with BI. As the resolution increase goes to 3× and 4×, however, the quality of the ANN model outputs did not improve, or rather the opposite. The ANN models with resolution increase 3× and 4× were still able to capture the cell borders.

Figure 10:
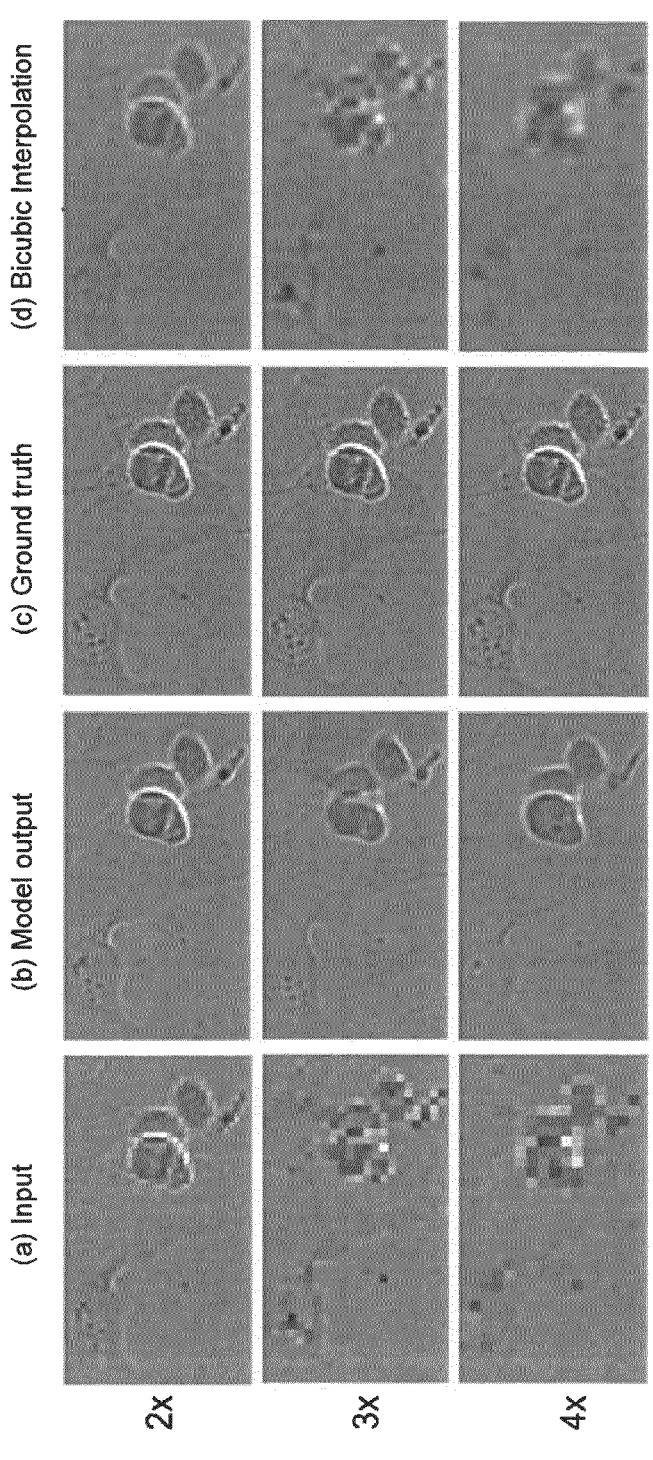
FIG. 10 shows examples of cell images in training ANN models according to the present disclosure.

FIG. 10 shows examples of cell images in training ANN models according to the present disclosure. Specifically, FIG. 10 shows ability of different ANN models to recreate images with a higher target resolution from images with lower resolution. The ANN models were trained at 2×, 3× and 4× resolution increase (corresponding to the image rows in FIG. 10) and the output images from the ANN models (see column (b) in FIG. 10) can be seen in comparison with the target images (see column (c), ground truth) and images obtained with a bicubic interpolation upscaling (see column (d) in FIG. 10) derived from the input images (see column (a) in FIG. 10).

From FIG. 10, with the training of the ANN model (LR to OR), it seems that the LR images suffer from a sharp information loss in the 3× and 4s setting. Many of the details in the ground truth image is missing in its LR counterpart. The recreation was still much better than that of BI in this setting.

Application to Live Cell Imaging

In live cell imaging, image quality may be critical for making correct decisions. In order to increase resolution, however, it is often necessary to reduce the field of view (FOV) by zooming in. Ideally, an instrument would capture high resolution with large field of view. Due to various limitations ranging from instrument throughput, hardware limitations, hard-drive storage limitations, etc., however, this may not be feasible.

Figure 11:
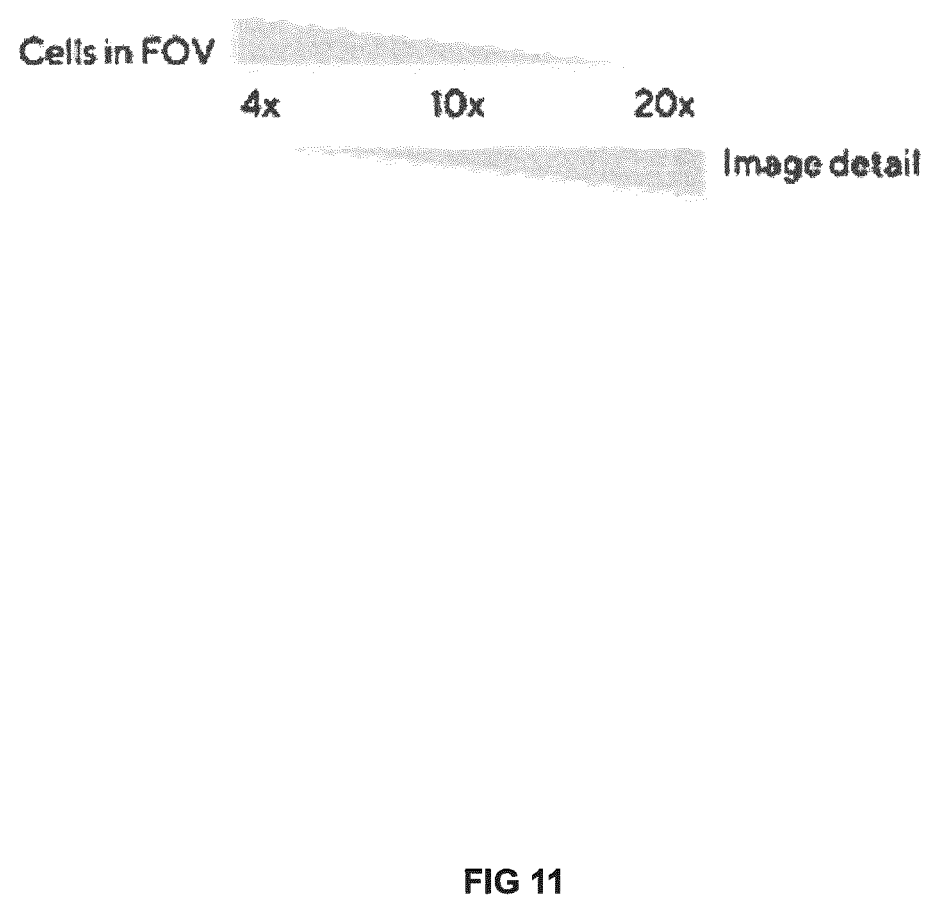

Thus, image acquisition at higher magnifications may yield sharper and more detailed images, while lower magnifications may enable a large number of cells to be captured within the FOV. As the magnification increases, the number of cells in the FOV decreases, as shown in FIG. 11.

By increasing the effective resolution, more detailed images can be obtained without sacrificing the number of cells in the FOV. Rare cellular events may thus be more likely to be captured, and the statistical relevance of whole population studies may be increased. To replicate this in a conventional manner (e.g., by acquiring a larger number of high magnification images and combining them) may be time consuming, laborious work, and can damage cells due to increased phototoxicity.

Applying a method according to the present disclosure to images acquired at 20× can improve the image on a cellular level. Resolution of cell edges may be increased, which may enable more accurate cell segmentation, for instance, subcellular features may have enhanced texture and clarity, reflecting the biological structures. Although accurate label-free quantification of subcellular processes in 20× images has not yet been possible, by improving image quality subcellular organelles such as the nucleus can be more clearly visualized. Further, texture, perimeter, solidity features may be more accurately quantified. This is demonstrated by FIG. 12 which shows enhanced images of cells undergoing NETosis, a process where the nucleus expands and changes shape, before releasing contents into the cytoplasm.

Figure 12:
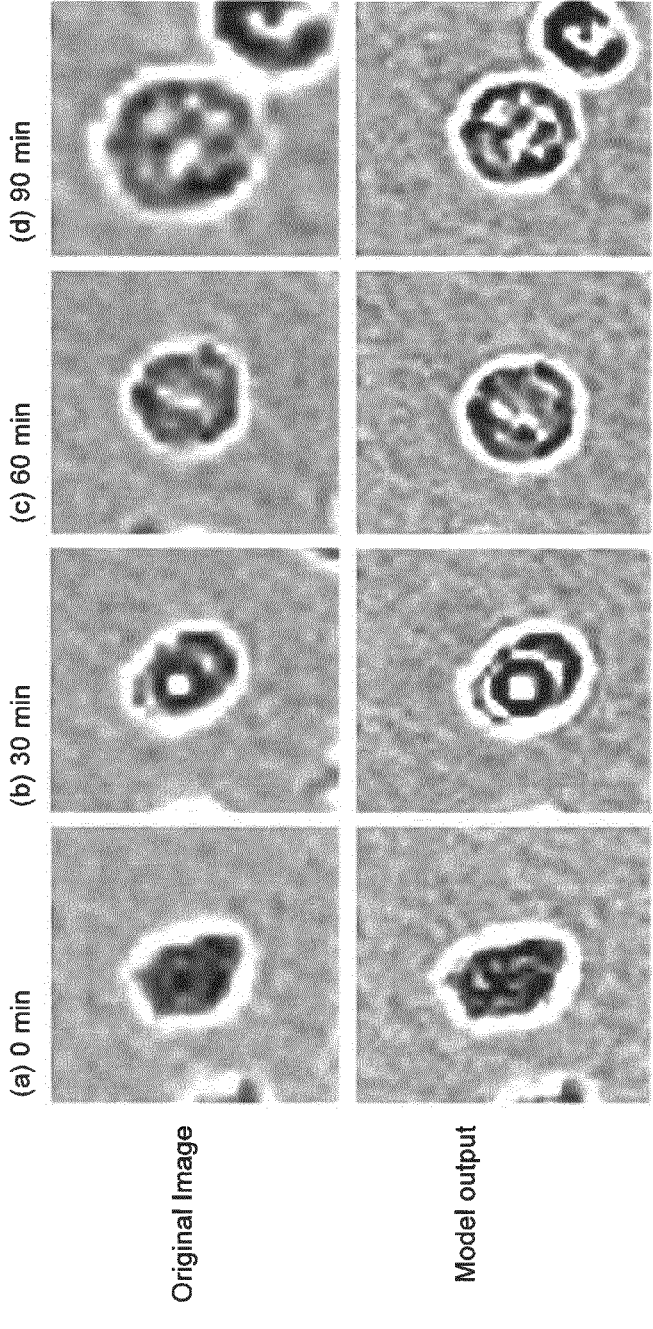
FIG. 12 shows exemplary images of a neutrophil-like cell undergoing NETosis, including captured images and images processed with a method according to the present disclosure.

FIG. 12 shows A neutrophil-like cell undergoing NETosis. The top image row of FIG. 12 indicates images acquired at 20× from 0 to 90 minutes (columns (a), (b), (c) and (d)), bottom image row of FIG. 12 indicates the same images processed using an ANN model trained according to the present disclosure. As can be seen from FIG. 12, the processed image at 0 min has a more visible outline and the cellular contents have increased texture, consistent with a cell of this type. In other words, visible texture within the cell, the outer cell boundary and the cell shape are more distinct in the processed image at 0 min. At 30 min, the nucleus has enlarged and again this is more prominent in the processed image. For example, in the processed image at 30 min, the outer cell boundary is clearer, and nucleus is more prominent reflecting the biological process of DNA decondensation. At 60 min and 90 min, the processed image again shows better texture in the area where the nucleus has expelled its contents into the cytoplasm and a much clearer cell boundary. For instance, in the processed image at 60 min, texture within the cell is more visible and the cell outline is clearer. Further, in the processed image at 90 min, the outer cell boundary is clearer, texture and cell contents are visible, and the shape of the cell is more distinct.

Further Experiments on Live Cell Imaging

The following provides an exemplary workflow where images are acquired with standard quality, and then magnified in silico using an ANN model according to the present disclosure.

In these experiments, a dataset of phase contrast microscopy images at 10× magnification of cell cultures was provided by Essen Instruments/Inc. dba Essen Bioscience, Inc. The dataset consisted of image taken from the IncuCyte® S3 and consisted of images of seven different cell types, namely:

A549
HeLa
HT1080.
HUVEC
Jurkat
MDAMB231
PC3
SKOV3

The dataset consisted of 1746 images, and were divided into training, validation and test datasets. The training data consisted of 1037 images from all cell types and the validation data had 259 images. The test data consisted of 450 images from all cell cultures with some images coming from the same well but segregated from the wells in the training and validation dataset.

A CNN with the ResNet architecture as used in B. Lim, S. Son, H. Kim, S. Nah, and K. M. Lee, "Enhanced Deep Residual Networks for Single Image Super-Resolution," *ArXiv*1707.02921 *Cs*, July 2017 (available online at: https://arxiv.org/abs/1707.02921) was trained by taking patches of the training images and then down-sampling the image patches to half the resolution with bicubic interpolation and then tasking the network with recreating the original image patch. This was done with the Adam optimizer for 2000 epochs, a batch size of 20 and a learning rate of 0.0001. Pixelwise Mean Absolute Error (MAE) was used as a loss function and the network was evaluated on both MAE, peak signal-to-noise ratio (PSNR) and a visual inspection of the image quality on the validation data.

When the network was fully trained, the model with highest MAE and PSNR was selected and further validated on the test data to ensure generalizability. In this final step, the network was modified to take the original images as input instead of the down-sampled training and validation images. Thus, the test images were increased in resolution from 10× to 20×, these HR images were then compared with up-sampled images from the test set using bicubic interpolation and nearest neighbor interpolation. Visual inspection showed higher fidelity in the 20× images produced by our model than those compared with.

Figure 13:
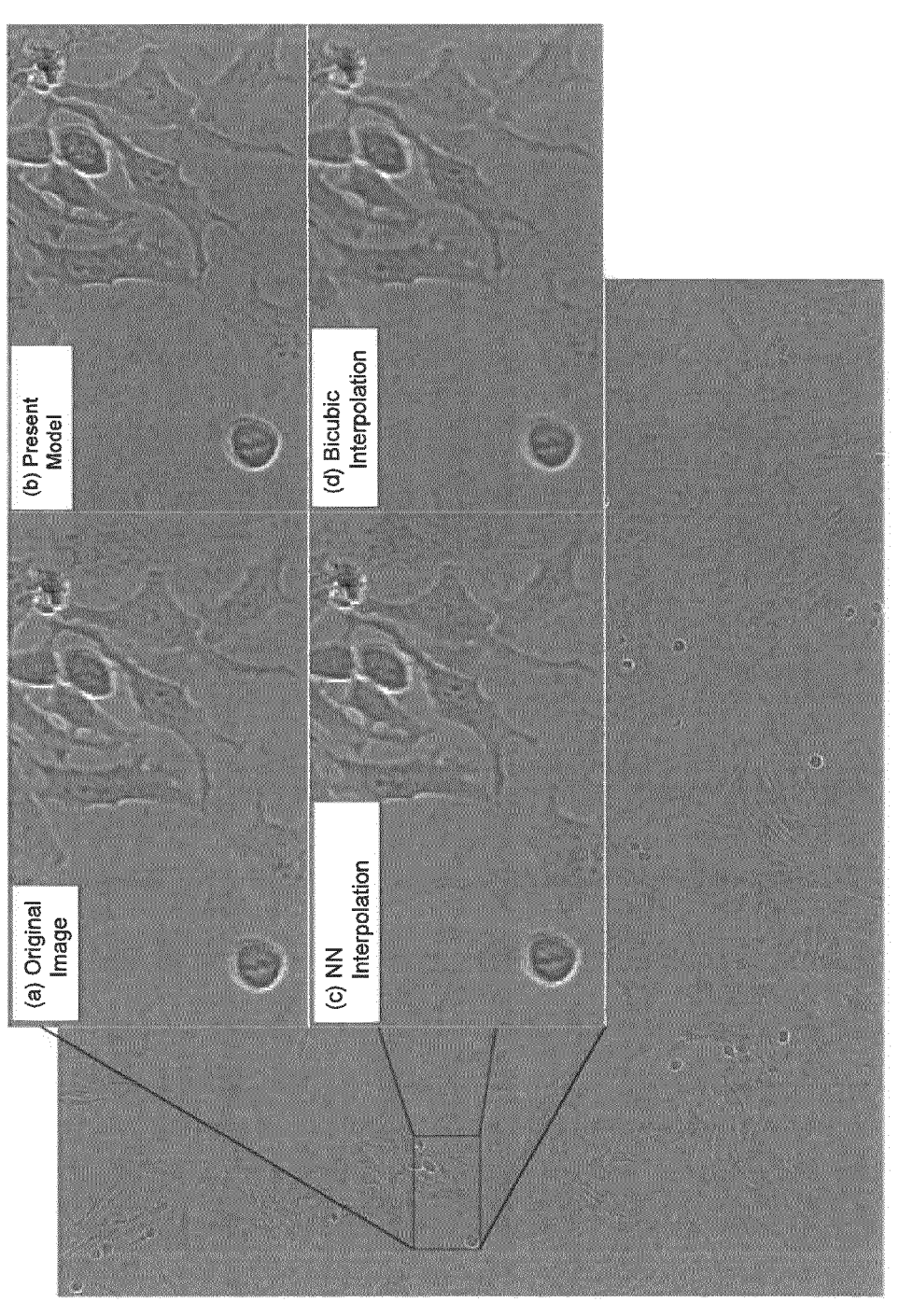
FIG. 13 shows examples of images for comparison of images obtained by a method according to the present disclosure, by nearest neighbor interpolation and by bicubic interpolation.
Figure 14:
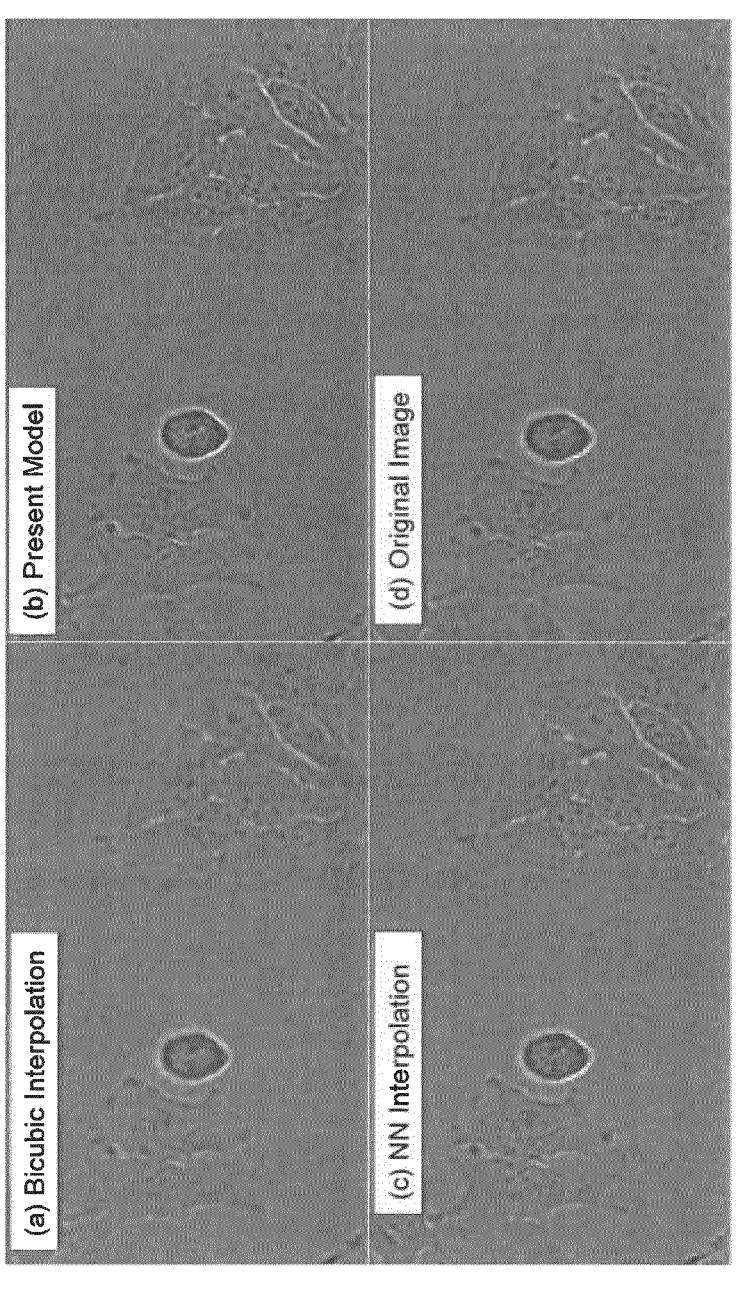
FIG. 14 shows further examples of images for comparison of images obtained by a method according to the present disclosure, by nearest neighbor interpolation and by bicubic interpolation.

FIGS. 13 and 14 show image comparison of image enhancement with the ANN model according to the present disclosure (see (b) in FIGS. 13 and 14) compared with the original image (see (a) in FIG. 13 and (d) in FIG. 14), nearest neighbor interpolation (see (c) in FIGS. 13 and 14) and bicubic interpolation (see (d) in FIG. 13 and (a) in FIG. 14).

Possible Further Implementations

As can be seen from the experimental results described above with reference to FIGS. 9 and 10, for example, if the information loss to LR is too great, the ANN models according to the present disclosure might not be able to learn how to reconstruct the more fine-grained details of the image with a target resolution (e.g., HR). This issue does not arise in the same manner when one has actual access to LR-HR pairs where the model can learn the mapping directly.

In this regard, one possible implementation of the present disclosure for achieving higher resolution increases may be to use the method according to the present disclosure as a pre-training approach to later fine-tune the model on actual HR images. The advantage of the possible implementation may be that the amount of HR images needed may be less than without any pre-training.

In some circumstances, the information loss to LR might also be mitigated somewhat by an alternative way to down-scale such that information of important features that the model is desired to learn is kept. The importance is not necessarily to have exact replicas to what actual LR images would look like but may rather be to keep information of such important features. Accordingly, for example, instead of downscaling OR images with BI or NN as described above, a further ANN may be employed and trained for downscaling the OR images to LR images, and then train an ANN model according to the present disclosure to restore the OR images from the LR images. The further ANN for downscaling the OR images may be trained to preserve information used in the upscaling task of the ANN model according to the present disclosure.

It seems that the ANN models according to the present disclosure fair better on the natural images than the cell microscopy images with 3× and 4× resolution increase. This might be because there are more features that the model can pick up and learn to reconstruct in the natural images than the cell microscopy images. Natural images typically contain relatively few objects with mostly large textures, whereas cell images often contain many small objects that mostly disappear when resolution is decreased too much. This may further support the idea of the importance of keeping information intact in the down sampling step.

Hardware Configuration

Figure 15:
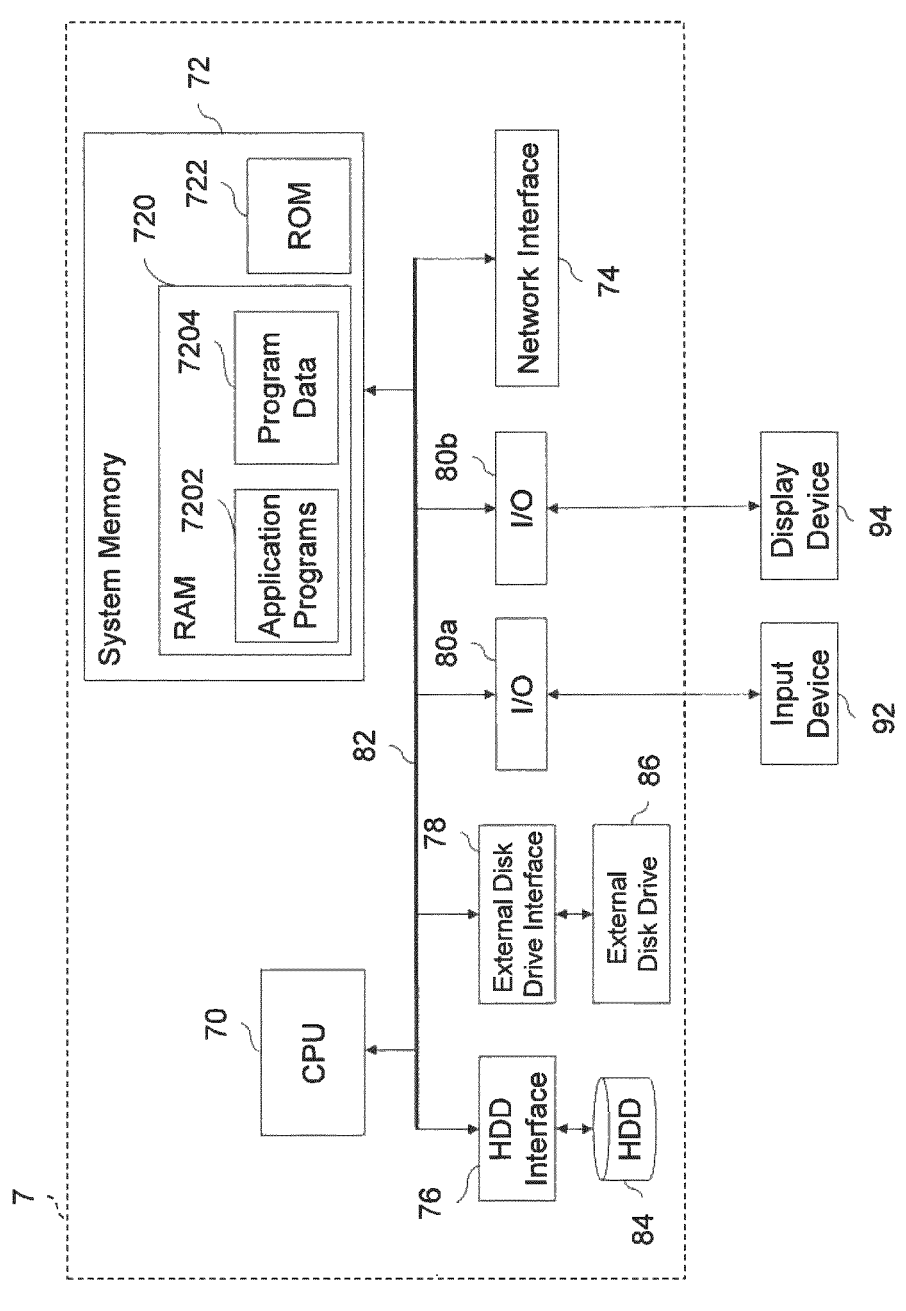
FIG. 15 shows an exemplary hardware configuration of a computer that may be used to implement at least a part of a system according to the present disclosure.

FIG. 15 shows an exemplary hardware configuration of a computer that may be used to implement at least a part of the system as described above. For example, the computing device 20 shown in FIG. 1 may be implemented with the computer 7 shown in FIG. 15. The computer 7 shown in FIG. 15 includes a central processing unit (CPU) 70, a system memory 72, a network interface 74, a hard disk drive (HDD) interface 76, an external disk drive interface 78 and input/output (I/O) interfaces 80. These components of the computer are coupled to each other via a system bus 82. The CPU 70 may perform arithmetic, logic and/or control operations by accessing the system memory 72. The system memory 72 may store information and/or instructions for use in combination with the CPU 70. The system memory 72 may include volatile and non-volatile memory, such as a random access memory (RAM) 720 and a read only memory (ROM) 722. A basic input/output system (BIOS) containing the basic routines that helps to transfer information between elements within the computer 7, such as during start-up, may be stored in the ROM 722. The system bus 82 may be any of several types of bus structures including a memory bus or memory controller, a peripheral bus, and a local bus using any of a variety of bus architectures.

The computer may include a network interface 74 for communicating with other computers and/or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The data structures may include relevant data for the implementation of the exemplary method and its variations as described herein. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or RAM 720, including an operating system (not shown), one or more application programs 7202, other program modules (not shown), and program data 7204. The application programs may include at least a part of the functionality as described above.

The computer 7 may be connected to an input device 92 such as mouse and/or keyboard and a display device 94 such as liquid crystal display, via corresponding I/O interfaces 80a and 80b as well as the system bus 82. In case the computer 7 is implemented as a tablet computer, for example, a touch panel that displays information and that receives input may be connected to the computer 7 via a corresponding I/O interface and the system bus 82. Further, in some examples, although not shown in FIG. 15, the computer 7 may further be connected to a printer and/or an imaging device such as a camera, via corresponding I/O interfaces and the system bus 82.

In addition or as an alternative to an implementation using a computer 7 as shown in FIG. 15, a part or all of the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

The invention claimed is:

1. A computer-implemented method for processing images, the method comprising:

down-sampling a plurality of first images having a first resolution for obtaining a plurality of second images having a second resolution, the first resolution being higher than the second resolution, each one of the plurality of second images being a down-sampled version of one of the plurality of first images;

training an artificial neural network, ANN, model to process an input image and output an output image having a higher resolution than the input image, wherein training data for the training comprises pairs of images, each pair of images including:

one of the plurality of second images as an input to the ANN model; and one of the plurality of first images, corresponding to the one of the plurality of second images, as a desired output from the ANN model in case the one of the plurality of second images is input to the ANN model;

inputting, to the trained ANN model, at least one of the plurality of first images having the first resolution higher than the second resolution of the plurality of second images that is input to the ANN model during the training of the ANN model; and obtaining at least one output image from the trained ANN model, the at least one output image having a third resolution that is higher than the first resolution of the plurality of first images.

2. The method according to claim 1, wherein the ANN model comprises a convolutional neural network.

3. The method according to claim 1, wherein the ANN model comprises:

a generator comprising a first ANN for processing the input image and outputting the output image having the higher resolution than the input image; and a discriminator comprising a second ANN for discriminating images generated by the first ANN from real images that are considered as desired outputs from the first ANN, wherein the ANN model is trained by:

training the generator, using the training data, to generate, from the input image, the output image having the higher resolution than the input image;

training the discriminator, using images output from the trained generator and at least some of the plurality of first images, to determine whether an image input to the second ANN is:

an image output from the trained generator; or one of the plurality of first images;

further training the generator and the discriminator by iterating the following steps:

updating, using an output from the trained discriminator, parameter values of the first ANN to increase an error rate of the second ANN; and updating, using an output from the trained generator, parameter values of the second ANN to decrease the error rate of the second ANN.

4. The method according to claim 3, further comprising:

calculating weighted average values between:

the parameter values of the first ANN obtained with the step of training the generator; and the updated parameter values of the first ANN obtained with the step of further training the generator and the discriminator, wherein the first ANN having the weighted average values as the parameter values is used as the trained ANN model for obtaining the at least one output image.

5. The method according to claim 1, further comprising:

applying an image augmentation pre-processing step to the plurality of first images before the down-sampling of the plurality of first images, wherein the image augmentation pre-processing step may include one or more of the following:

blurring;

adding pixel-wise noise;

applying out-of-focus distortion; and applying motion blur.

6. The method according to claim 1, wherein the first resolution is higher than the second resolution by a scaling factor (S) and the third resolution is higher than the first resolution by the scaling factor (S).

7. The method according to claim 1, wherein the plurality of first images comprise microscopic images of cells.

8. A non-transitory computer-readable medium comprising computer-readable instructions that, when loaded and run on a computer, cause the computer to perform the method according to claim 1.

9. A system for processing images, the system comprising:

a storage medium storing a plurality of first images having a first resolution and an artificial neural network, ANN, model for processing an input image to output an output image having a higher resolution than the input image; and a processor configured to:

down-sample the plurality of first images for obtaining a plurality of second images having a second resolution, the first resolution being higher than the second resolution, each one of the plurality of second images being a down-sampled version of one of the plurality of first images;

train the ANN model using training data that comprises pairs of images, each pair of images including:

one of the plurality of second images as an input to the ANN model; and one of the plurality of first images, corresponding to the one of the plurality of second images, as a desired output from the ANN model in case the one of the plurality of second images is input to the ANN model;

input, to the trained ANN model, at least one of the plurality of first images having the first resolution higher than the second resolution of the plurality of second images that is input to the ANN model during the training of the ANN model; and obtain at least one output image from the trained ANN model, the at least one output image having a third resolution that is higher than the first resolution of the plurality of first images.

10. The system according to claim 9, wherein the ANN model comprises a convolutional neural network.

11. The system according to claim 9, wherein the ANN model comprises:

a generator comprising a first ANN for processing the input image and outputting the output image having the higher resolution than the input image; and a discriminator comprising a second ANN for discriminating images generated by the first ANN from real images that are considered as desired outputs from the first ANN, wherein the ANN model is trained by:

training the generator, using the training data, to generate, from the input image, the output image having the higher resolution than the input image;

training the discriminator, using images output from the trained generator and at least some of the plurality of first images, to determine whether an image input to the second ANN is:

an image output from the trained generator; or one of the plurality of first images;

further training the generator and the discriminator by iterating the following steps:

updating, using an output from the trained discriminator, parameter values of the first ANN to increase an error rate of the second ANN; and updating, using an output from the trained generator, parameter values of the second ANN to decrease the error rate of the second ANN.

12. The system according to claim 11, wherein the processor is further configured to:

calculate weighted average values between:

the parameter values of the first ANN obtained with the step of training the generator; and the updated parameter values of the first ANN obtained with the step of further training the generator and the discriminator, wherein the first ANN having the weighted average values as the parameter values is used as the trained ANN model for obtaining the at least one output image.

13. The system according to claim 9, wherein the processor is further configured to:

apply an image augmentation pre-processing step to the plurality of first images before the down-sampling of the plurality of first images, wherein the image augmentation pre-processing step may include one or more of the following:

blurring;

adding pixel-wise noise;

applying out-of-focus distortion; and applying motion blur.

14. The system according to claim 9, wherein the first resolution is higher than the second resolution by a scaling factor and the third resolution is higher than the first resolution by the scaling factor.

15. The system according to claim 9, wherein the plurality of first images comprise microscopic images of cells.

*     *     *     *     *